United States Patent [19]

Su

[11] Patent Number: 4,666,327

[45] Date of Patent: May 19, 1987

[54] JOINT FOR FOLDABLE ALUMINUM LADDERS

[76] Inventor: George Su, No.17-1,Kua-Ku Chuiang, Kua-Ku village, Ta An Country, Taichung Hsein, Taiwan

[21] Appl. No.: 909,595

[22] Filed: Sep. 22, 1986

[51] Int. Cl.[4] .................................................. F16D 1/00

[52] U.S. Cl. .......................................... 403/24; 403/96; 182/163; 182/24; 16/324; 16/329; 16/331

[58] Field of Search ......................... 403/92, 93, 96, 24; 182/27, 24, 163; 16/324, 329, 331, 353

[56] References Cited

U.S. PATENT DOCUMENTS

| | | | |
|---|---|---|---|
| 3,731,342 | 5/1973 | Cousin | 16/329 |
| 3,811,151 | 5/1974 | Kuemmerlin | 16/329 |
| 4,407,045 | 10/1983 | Boothe | 403/92 X |
| 4,566,150 | 1/1986 | Boothe | 16/353 X |

*Primary Examiner*—Andrew V. Kundrat
*Attorney, Agent, or Firm*—Morton J. Rosenberg

[57] ABSTRACT

A joint for foldable aluminum ladders comprising a first base, a second base, a control plate and a selecting means. The second base has a middle plate inserted between two parallel plates which are connected at the end of the first base. The control plate is inserted between one of the parallel plates and the middle plate. The parallel plates, middle plate and control plate each have a central hole to allow a sleeve to be inserted therethrough. The parallel plates, middle plate and control plate also have apertures which lay some distance along the edges. The selecting means has a fixing link inserted through the sleeve and an inserting link which is shorter than the fixing link. A compressible spring is disposed around the lower end of the fixing link and a nut is secured at the threaded portion of the fixing link. When the selecting means is pulled outwardly, the legs of the ladder can be freely rotated to adjust the angle of the ladder, then the angle of the ladder is fixed with the inserting link being inserted through the most appropriate apertures of the first base, second base and control plate.

1 Claim, 11 Drawing Figures

JOINT FOR FOLDABLE ALUMINUM LADDERS

BACKGROUND OF THE INVENTION

Conventional aluminum ladders can be folded for storage or opened for use. Referring to FIG. 11, it can be seen that a conventional aluminum ladder can be propped open at a certain angle only, that is, the ladder is only adapted for one fixed working condition. Therefore the shape of the ladder can not be changed and so in practice has limited usage. A conventional ladder, for example, can not be folded into the shape shown in FIG. 10.

SUMMARY

It is the primary objective of the present invention to provide a joint for foldable aluminum ladders which can be easily folded in several different shapes, so that the ladder will be more practical to use.

The features of the present invention which are believed to be novel are set forth with particularity in the appended claims. The present invention, both as to its organization and manner of operation, together with further objects and advantages thereof, may best be understood by reference to the following description, taken in connection with the accompany drawings.

DETAILED DESCRIPTION OF THE PREFERRED EMBODIMENT

Figure 1:
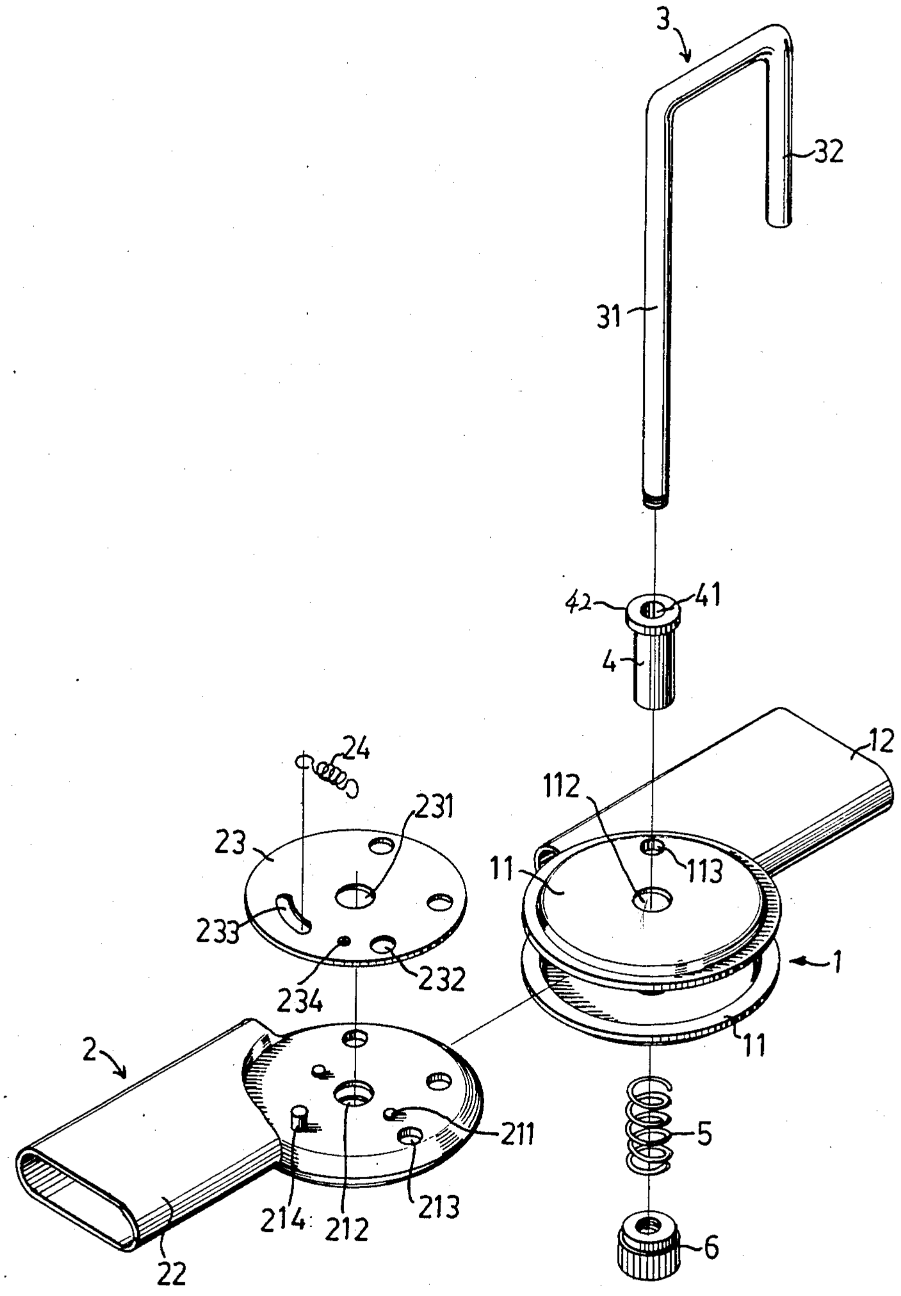
FIG. 1 is an exploded view of the present invention.
Figure 9:
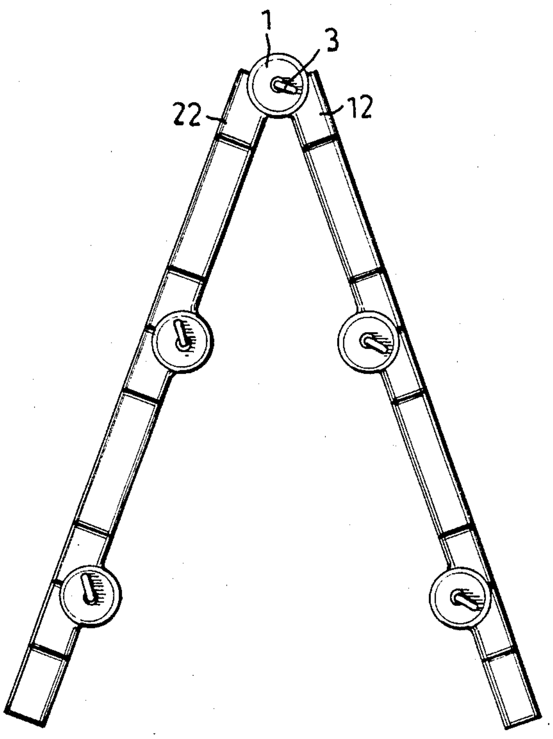
FIG. 9 shows a side view of the ladder of the present invention in a first working position.

Referring to FIG. 1, it can be seen that a first base (1) comprises a hollow leg (12) connected to the leg of ladder (as shown in FIG. 9) and two parallel plates (11) which are connected at the end of the hollow leg (12). Each parallel plate (11) has a central hole (112) at its center and an aperture (113) proximate to the edge thereof. The second base (2) also has a hollow leg (22) which is connected to the leg of the ladder (not shown) and a middle plate (21) which is connected at the end of the hollow leg (22). The middle plate (21) is inserted into the space (111) between the two plates (11) of the first base. Since the second base (2) can be formed of a metal (such as aluminum) sheet, there are two rivets (211) inserted through the middle plate (21) to joint the two sides of the middle plate (21). The middle plate (21) has a central hole (212), three apertures (213) which are disposed proximate to the edge, and an outwardly extending pin (214). The middle plate (21) is disposed in the space between the two parallel plates of the first base. The control plate (23), which is disposed between the upper plate (11) of the first base (1) and the middle plate (21) of the second base (2), has a central hole (231), three apertures (232) (corresponding to the central hole (212) and three apertures (213) of the middle plate (23)), a spring aperture (234) and an arc slot (233). In this condition, the pin (214) of said middle plate aligns with and passes through the arc slot (233). A spring (24) is arranged on the control plate (23) with one end connected to the pin (214) and the other end connected at the spring aperture (234). A sleeve (4), which has a central hole (41), is inserted respectively through all the above-mentioned central holes (112, 212, and 231). The sleeve (4) further has an upper edge (42) which contacts the upper plate (11) of the two parallel plates. A selecting means (3) has one fixing link (31) and one inserting link (32) which is shorter than the fixing link (31). The fixing link (31) is fitted through the central hole (41) of the sleeve (4) and a compressible spring (5). The lower end of the fixing link is threaded and fixed with a nut (6). Therefore, the selecting means (3) can be pulled outward and the first and second base (1 and 2) can be rotated relative to each other. When the inserting link (32) of the selecting means (3) inserts into proper apertures (113, 232, and 213), the ladder will be fixed at a certain angle.

Figure 2:
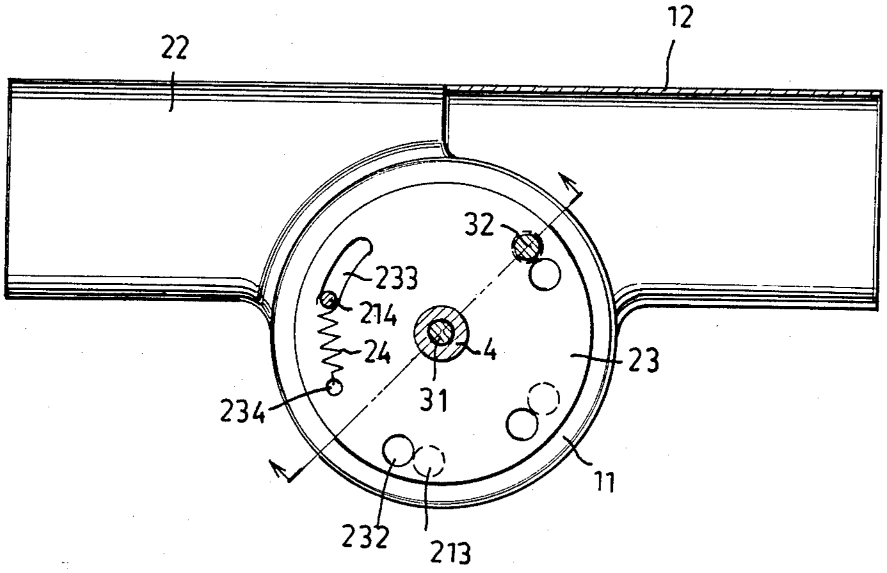
FIGS. 2 and 3 are cross-sectional views of the present invention which show the inserting link inserted through the aperture of first base.
Figure 3:
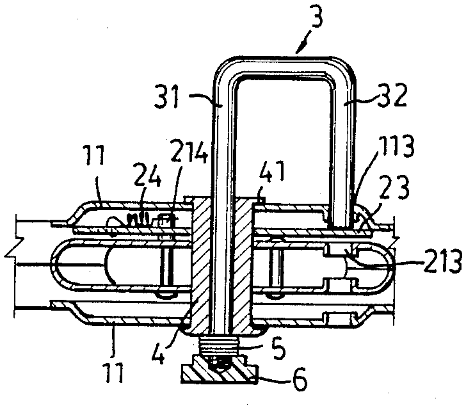
Figure 4:
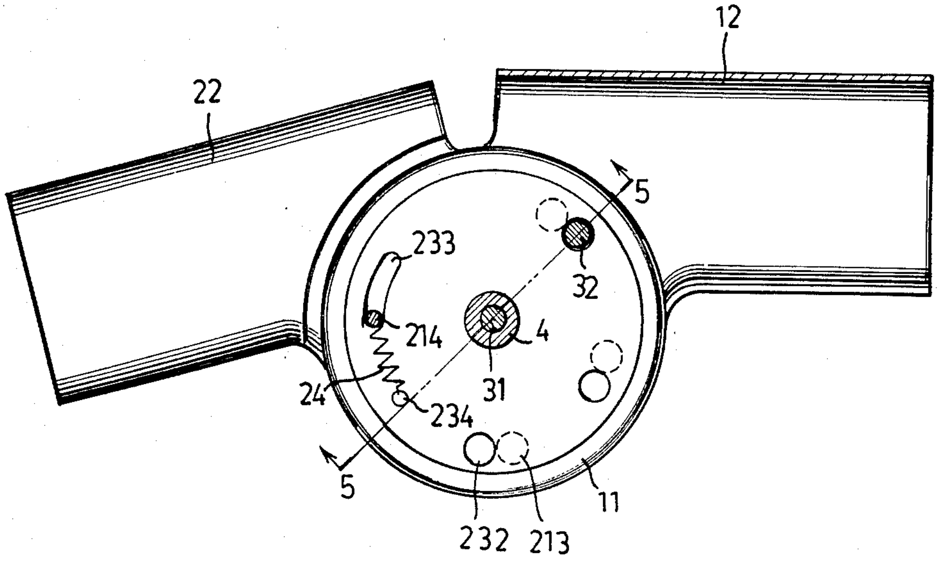
FIGS. 4 and 5 are cross-sectional views of the present invention which show the inserting link inserted into the aperture of control plate.
Figure 5:
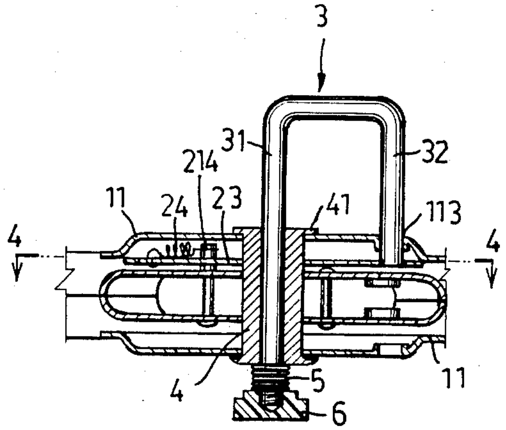
Figure 6:
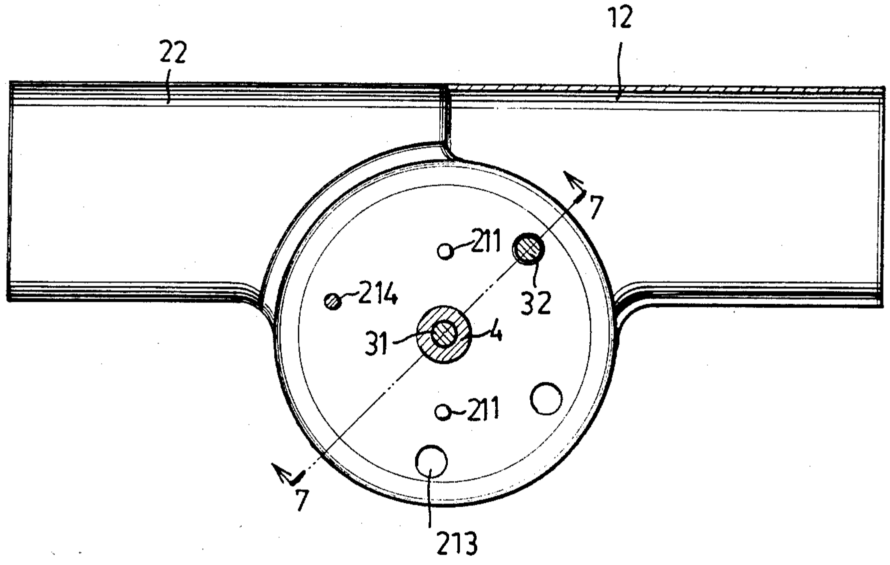
FIGS. 6 and 7 are cross-sectional views of the present invention which show the inserting link inserted into the aperture of first base.
Figure 7:
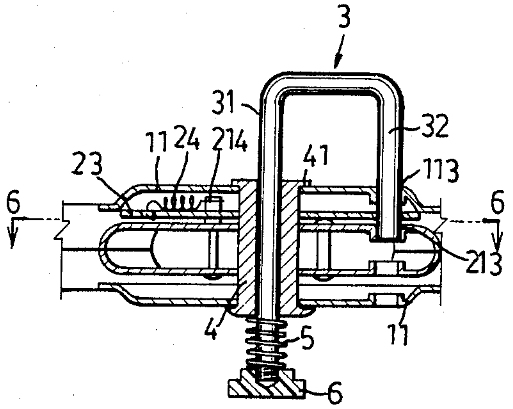
Figure 8:
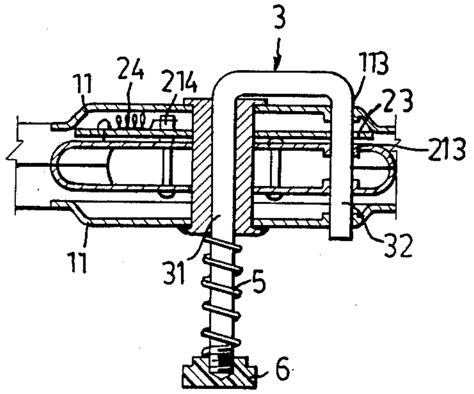
FIG. 8 is a cross-sectional view of the present invention showing the inserting link inserted through the apertures of first base, control plate and second base to lock the using position.

When the selecting means is pulled outwardly, the first base (1) and second base (2) can be freely rotated to adjust the angle of the ladder. FIGS. 2–8 show how to fix the angle of ladder after the angle is changed. Referring to FIGS. 2 and 3, it can be seen that the inserting link (32) is inserted through the aperture (113) of the upper plate (11) only. Because of the force of the spring (24), the apertures (232) of the control plate (23) are not aligned with the apertures (213) of the central plate (21) or the inserting link (32). Therefore, the ladder must be rotated again until the inserting link (32) is aligned with the aperture (232) of the control plate (23). At this point, the user can select the angle of the ladder by choosing the most appropriate aperture (232) and inserting the inserting link (32) as shown in FIGS. 4 and 5. After the inserting link (32) is inserted through the apertures (113) and (232) of the upper plate (11) and control plate (23), the ladder is rotated back a little to the position where the apertures of the central plate (21) are aligned with the inserting link (32), as shown in FIGS. 6 and 7. Therefore, the inserting link (32) is pushed down by the force of the spring (5) and inserted through all the apertures (113, 232, and 213) (as shown in FIG. 8) to fix the angle of the ladder.

Figure 10:
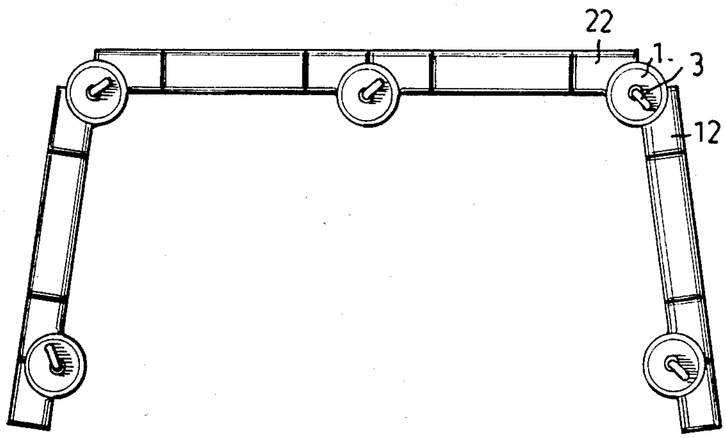
FIG. 10 shows a side view of the ladder of the present invention in a second working position.
Figure 11:
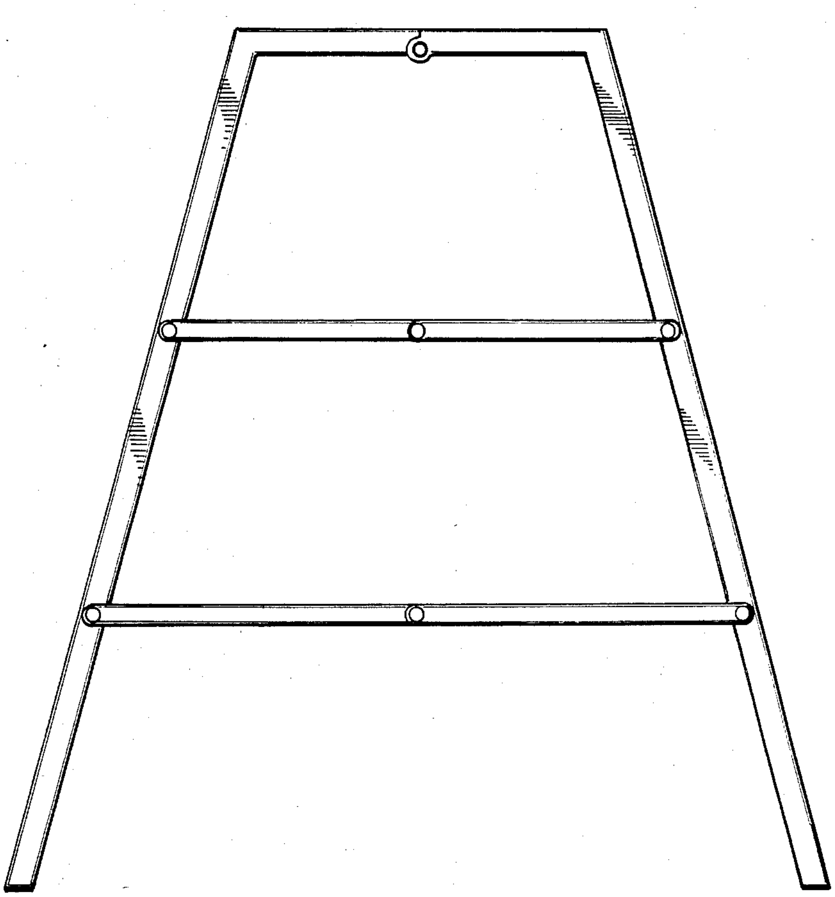
FIG. 11 shows a front view of a conventional ladder in working position.

Accordingly, referring to FIGS. 9 and 10, it is apparent that the joint not only allows for easy adjustment of the angle of the ladder, but also allows for easy modification of the shape of the ladder so as to be adaptable for different working conditions.

Since other modifications within the spirit and scope of the invention may readily be effected by persons skilled in the art, it is to be understood that this application is not limited to the particular structure described by way of example hereinabove.

I claim:

1. A joint for foldable aluminum ladders comprising:

a first base, having a hollow leg connected to a leg of a ladder and two parallel plates connected at the end of said hollow leg, each of said two parallel plates having a central hole and an aperture proximate to the edge thereof;

a second base, having a hollow leg connected to a leg of said ladder and a middle plate connected at the end of the hollow leg, said second base being formed of a metal sheet having two rivets inserted through said middle plate to joint two sides of said middle plate, said middle plate having a central hole, three apertures being disposed proximate to the edge thereof and an outwardly extending pin, said middle plate being disposed in the space between said two parallel plates of said first base;

a control plate, having a central hole, three apertures, a spring aperture and an arc slot; said central hole, three apertures and arc slot of said control plate being aligned respectively with said central hole and three apertures and pin of said middle plate;

a spring, one end of which is connected to said pin and the other end of which is connected at the spring aperture of said control plate;

a sleeve, inserted respectively into the central holes of said first base, control plate and second base; said sleeve having a central hole and an upper edge contacting the upper parallel plate;

a selecting means, having a fixing link with a threaded lower end and an inserting link which is shorter than said fixing link; said fixing link fitting through said central hole of said sleeve and a compressible spring and being secured with a nut at the lower end thereof;

said first base and said second base being freely rotatable so as to adjust the angle of said ladder when said selecting means is pulled outwardly; the angle of said ladder being fixed when said inserting link is respectively inserted through the most appropriate apertures of said first base, said control plate and said second base.

* * * * *